United States Patent [19]

Karrer et al.

[11] Patent Number: 4,731,393

[45] Date of Patent: Mar. 15, 1988

[54] PROCESS FOR CHEMICALLY BONDING STABILIZERS TO POLYMERS

[75] Inventors: Friedrich Karrer, Zofingen; Peter Hofmann, Basel, both of Switzerland

[73] Assignee: Ciba-Geigy Corporation, Ardsley, N.Y.

[21] Appl. No.: 873,853

[22] Filed: Jun. 11, 1986

Related U.S. Application Data

[63] Continuation of Ser. No. 757,916, Jul. 22, 1985, abandoned, which is a continuation of Ser. No. 520,379, Aug. 4, 1983, abandoned.

[30] Foreign Application Priority Data

Aug. 11, 1982 [CH] Switzerland ............................ 4810/82

[51] Int. Cl.$^4$ ............................ C08J 3/28; C08L 23/36
[52] U.S. Cl. ............................ 522/117; 522/114; 524/99; 524/100; 524/102; 525/263; 525/279; 525/281
[58] Field of Search ............................ 525/263, 281, 279; 544/212; 524/99, 100, 102; 522/114, 116, 117

[56] References Cited

U.S. PATENT DOCUMENTS

| | | | |
|---|---|---|---|
| 3,043,716 | 7/1962 | Busse et al. ............................ | 525/281 |
| 3,436,371 | 4/1969 | Ware ............................ | 525/263 |
| 3,522,222 | 7/1970 | Taylor ............................ | 525/263 |
| 3,904,581 | 9/1975 | Murayama et al. ............................ | 260/45.8 N |
| 3,925,376 | 12/1975 | Chalmers et al. ............................ | 544/212 |
| 3,980,629 | 9/1976 | Sacarini et al. ............................ | 525/345 |
| 4,086,204 | 4/1978 | Cassandrini et al. ............................ | 544/212 |
| 4,102,870 | 7/1978 | Hofmann et al. . | |
| 4,108,829 | 8/1978 | Cassandrini et al. ............................ | 544/212 |
| 4,136,060 | 1/1979 | Heschele . | |
| 4,154,722 | 5/1979 | Malherbe et al. . | |
| 4,161,592 | 7/1979 | Evans et al. ............................ | 544/212 |
| 4,234,728 | 11/1980 | Rody et al. ............................ | 544/212 |
| 4,263,434 | 4/1981 | Cassandrini et al. ............................ | 544/212 |
| 4,283,505 | 8/1981 | Kleeberg et al. ............................ | 525/263 |
| 4,289,686 | 8/1981 | Rody et al. ............................ | 544/212 |
| 4,294,963 | 10/1981 | Rody ............................ | 544/212 |
| 4,315,859 | 2/1982 | Nikles ............................ | 544/212 |
| 4,356,287 | 10/1982 | Loffelman et al. ............................ | 544/212 |
| 4,400,505 | 8/1983 | Loffelman et al. ............................ | 544/212 |
| 4,413,093 | 11/1983 | Loffelman et al. ............................ | 525/185 |
| 4,435,555 | 3/1984 | Loffelman et al. ............................ | 526/261 |
| 4,461,861 | 7/1984 | Loffelman et al. ............................ | 524/100 |

FOREIGN PATENT DOCUMENTS

| | | | |
|---|---|---|---|
| 617832 | 1/1964 | Canada ............................ | 525/281 |
| 13682 | 8/1980 | European Pat. Off. . | |
| 2506105 | 8/1976 | Fed. Rep. of Germany . | |
| 51-52451 | 5/1976 | Japan ............................ | 525/281 |

*Primary Examiner*—Allan M. Lieberman
*Attorney, Agent, or Firm*—Harry Falber

[57] ABSTRACT s-Triazine compounds, the molecule of which contains at least one ethylenically unsaturated group and at least one 2,2,6,6-tetramethylpiperidine group can be grafted onto organic polymers, in particular onto polyolefines, in the presence of free-radical formers or by means of irradiation. Examples of free-radical formers are peroxy or azo compounds. If polyunsaturated piperidine-triazine compounds are used, it is also possible to achieve crosslinking of the polymer, particularly in the case of polyethylene.

16 Claims, No Drawings

PROCESS FOR CHEMICALLY BONDING STABILIZERS TO POLYMERS

This application is a continuation of application Ser. No. 757,916, filed July 22, 1985, which is a continuation of Ser. No. 520,379, filed Aug. 4, 1983, now both abandoned.

The invention relates to a process for chemically bonding stabilisers to polymers. The stabilisers concerned are those belonging to the series comprising the polyalkylpiperidines, which are particularly important as light stabilisers for polymers. The effect of the chemical bonding to the polymer is to prevent the volatilisation and migration of the stabiliser and thus to prolong its protective action. The invention also relates to new polyalkylpiperidine compounds which have been developed for this process.

It is known that polyalkylpiperidine compounds, as sterically hindered amines, are valuable stabilisers for organic polymers; in particular, they protect the polymers against damage caused by the action of light. They have, therefore, been used in industry as stabilisers for a number of plastics, in particular for the stabilisation of polyolefines, styrene copolymers, polyamides, polyurethanes and various lacquer resins. The stabilising action is, however, not the only factor for their use in industry; a number of other requirements must also be met, such as compatibility or duration of action. The duration of action is limited firstly by the stability of the stabiliser and, secondly, by possible migration, volatilisation or extraction out of the substrate. Particularly in the case of thin-layer substrates, such as sheeting, fibres or lacquer films, the latter processes are decisive for the duration of action of a stabiliser. As in the case of other classes of stabilisers, there has also been no lack of attempts to prevent or to reduce the migration, volatilisation and extraction out of the substrate of the polyalkylpiperidine derivatives. In particular, increasing the size of the molecule by providing oligomeric or polymeric stabilisers has provided a considerable technical advance in this field.

However, there are limits to this increase in the size of the molecule in that the optimum capacity for distribution decreases as the degree of polymerisation increases. This results in inhomogeneous distribution of the stabiliser in the substrate and thus to decreasing effectiveness. Chemical incorporation into substrates by copolymerisation appears to be the better solution, since in this case the stabiliser molecules are homogeneously distributed, and migration, volatilisation or extraction of the stabiliser is prevented completely by the chemical bonding to the substrate. Copolymerisable stabilisers of this type must, however, be developed specifically for each individual plastic, since the synthesis, the properties and the possible uses of the plastic are then modified. Thus, it has been suggested to incorporate polyalkylpiperidine derivatives having OH or NH groups into polyurethanes (German Offenlegungsschrift No. 2,719,132), or to incorporate polyalkylpiperidine derivatives having two OH groups into aromatic polyetheresters (U.S. Pat. No. 4,136,090). As explained above, modifying the polymers in this way by incorporating stabiliser comonomers is only possible for specific polymers, but is not a general method, and it can only be carried out during the synthesis of the polymer.

Subsequent chemical bonding of stabiliser molecules to finished polymers has also already been suggested. German Offenlegungsschrift No. 2,727,385 described diazocarboxylic acid derivatives of polyalkylpiperidines which can be added to a very wide variety of organic polymers and which can undergo a chemical grafting reaction with the CH groups of the polymer on heating. For various reasons, however, this process has not been able to gain acceptance in industrial practice. The main reasons are the high costs and the inadequate stability of such diazocarboxylic acid derivatives.

Another method has now been found, by means of which it is possible to bond polyalkylpiperidine stabilisers chemically to polymers, and which can be used for a large number of polymers. This process consists in grafting an ethylenically unsaturated polyalkylpiperidine derivative onto the polymer to be stabilised, in the presence of free radicals. In this process, the free radicals can be produced by chemical means by adding a free-radical former, or by physical means, in particular by irradiation. However, it has been found in this respect that grafting of this type does not proceed in a satisfactory manner with all unsaturated polyalkylpiperidine derivatives. The progress of the grafting reaction depends on the structure of the piperidine derivative used, and it had been necessary to find special classes of compounds which are suitable for this purpose and have a high stabilising effect.

It has been found that unsaturated s-triazine derivatives of 2,2,6,6-tetramethylpiperidines are particularly suitable for a grafting reaction of this type. The invention relates, therefore, to a process for chemically bonding polyalkylpiperidine stabilisers to polymers by grafting, by the action of free radicals produced by chemical or physical means, ethylenically unsaturated polyalkylpiperidine derivatives onto the polymer to be stabilised, which comprises using, as the stabiliser, an s-triazine compound, the molecule of which contains at least one ethylenically unsaturated group and at least one 2,2,6,6-tetramethylpiperidine group.

In addition to this grafting reaction, it is also possible for crosslinking of the polymer to take place as the result of the direct action of the free-radical former or of the irradiation on the polymer chain. A free radical crosslinking of this type is carried out in industry in certain cases in order thereby to impart specific properties to the polymer.

If, in a crosslinking reaction of this type, an s-triazine compound which, in addition to at least one 2,2,6,6-tetramethylpiperidine group, contains at least two ethylenically unsaturated groups is added, the crosslinking of the polymer is thereby intensified and/or accelerated. A compound of this type can, therefore, serve not only as a stabiliser which can be bonded chemically, but also as a crosslinking auxiliary. As a result of this, smaller quantities of free-radical formers or shorter irradiation times are required.

It has also been found that piperidine-triazine stabilisers of this type are not only excellent light stabilisers, but also have an outstanding stabilising action against thermo-oxidative degradation. Admittedly it is known that piperidine light stabilisers also have a certain stabilising action against thermo-oxidative degradation, but it was surprising to have found, in the chemically incorporatable stabilisers which are used in accordance with the invention, a class of compounds which has this thermo-oxidative stabilising action to such a pronounced extent. This makes it possible to dispense, wholly or partially, with the antioxidants customarily added when polyolefins are processed.

While the process is suitable, in principle, for all organic polymers, it is particularly suitable for polymers having a high content of $CH_2$ and $CH_3$ groups. The process is particularly important when used for stabilising polyolefines and olefine copolymers, in particular polypropylene, polyethylene and chlorinated polyethylene. If the process is carried out by crosslinking the polymer, polymers of interest are, in particular, polyethylene, chlorinated and chlorosulfonated polyethylene and ethylene/vinyl acetate copolymers. In both cases it is possible to stabilise not only individual polymers but also mixtures of polymers (polyblends) by means of the process according to the invention.

The chemical bonding (grafting or crosslinking) is initiated by free radicals which are produced within the polymer in the presence of the unsaturated stabilisers. This can be effected by adding free-radical formers, i.e. compounds which decompose into free radicals on heating. Examples of known free-radical formers are organic peroxy compounds, in particular organic peroxides, peroxy-esters, peroxy-ketals and diacyl peroxides.

Examples of these are di-tert.-butyl peroxide, dicumyl peroxide, bis-(tert.-butylperoxy-isopropyl)-benzene, dibenzoyl peroxide, tert.-butyl peroxybenzoate or 1,1-di-tert.-butyl-peroxy-3,3,5-trimethylcyclohexane.

A second group of known free-radical formers are the aliphatic azo compounds, for example 2-tert.-butylazo-2-methoxy-4-methylpentane, 2-tert.-butylazo-2,4-dimethylpentane, 1-tert.-butylazo-1-acetoxycyclohexane or 2,2-azobis-(2-acetoxypropane).

A further group of free-radical formers are certain 1,2-diphenylalkane derivatives, for example 1,2-diphenylsuccinonitrile, dialkyl 1,2-diphenyl-1,2-dicyanosuccinates or 1,2-diphenylethanetetracarboxylic acid esters. Further known free-radical formers are the oxime-esters, for example ethyl O-benzoyl-laurylhydroximate.

The free-radical formers which are suitable are stable at room temperature and decompose only at an elevated temperature. Since the decomposition temperatures of the individual free-radical formers are known, it is possible for those skilled in the art to control the temperature of the reaction of the stabiliser with the polymer by choosing the free-radical former.

The free radicals can, however, also be produced by irradiating the polymer with high-energy radiation, in particular by irradiation with γ-rays or electron radiation. This has the advantage that no residues of the free-radical former remain in the polymer and that the free radicals are produced immediately at the polymer chain, whereas, if free-radical formers are used, the free radical formed by the decomposition in most cases produces the desired polymer radicals only as the result of a transfer reaction—in most cases abstraction of hydrogen—to the polymer chain.

In cases in which crosslinking of the polymer is desired, it is advisable to use, as the stabiliser, a piperidinetriazine compound containing at least two unsaturated groups in its molecule. In this case either crosslinking can only be effected through the stabiliser molecule or both direct crosslinking of the polymer chains with one another and crosslinking via the stabiliser take place.

The graftable stabilisers which can be used for the process according to the invention are s-triazine compounds, in which the molecule has at least one 2,2,6,6-tetramethylpiperidine group and at least one unsaturated group. In these compounds, the unsaturated group can be linked to the triazine skeleton via O or N or it can be a substituent on the piperidine nitrogen or on a linking member between the triazine and the piperidine. The compounds can also contain several s-triazine rings or can be oligomeric polyaminotriazines. Some triazine-polyalkylpiperidines of this type are described in German Offenlegungsschriften Nos. 2,319,816, 2,636,130, 2,636,144 and 2,752,740 and in European Patent A Nos. 3,542, 13,665, 13,682 and 14,683.

The following classes of piperidine-triazine compounds are particularly suitable for the process according to the invention.

1. Compounds of the general formula I

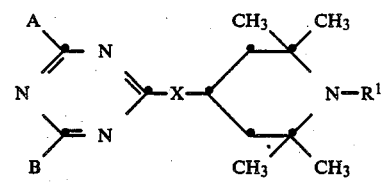

in which $R^1$ is hydrogen, Oxyl oxygen, $C_1$–$C_{12}$-alkyl, $C_3$–$C_7$-alkenyl, $C_7$–$C_{11}$-phenylalkyl, cyanomethyl, $C_2$–$C_{18}$-alkanoyl or $C_3$–$C_{18}$-alkenoyl or a group $-CON(R^2)(R^3)$ or $-CH_2-CH(R^4)-OH$ in which $R^2$ is $C_1$–$C_{12}$-alkyl, allyl, cyclohexyl, benzyl, phenyl or $C_7$–$C_{12}$-alkylphenyl and $R^3$ is hydrogen, $C_1$–$C_{12}$-alkyl, allyl or benzyl or $R^2$ or $R^3$, together with the N atom to which they are attached, form a 5-membered or 6-membered heterocyclic ring and $R^4$ is hydrogen, $C_1$–$C_{12}$-alkyl, phenyl, $C_2$–$C_{13}$-alkoxymethyl or phenoxymethyl, X is a divalent group of the formula $-O-$, $-N(R^5)-$, $-NH-CH_2-CH_2-$, $-NH-(CH_2)_2-O-$, $-NH(CH_2)_3-O-$ or $-N(R^5)-R^7-N(R^6)-$ in which $R^5$ is hydrogen, $C_1$–$C_{12}$-alkyl, $C_3$–$C_7$-alkenyl, cyclohexyl, $C_3$–$C_{12}$-alkoxyalkyl, $C_5$–$C_{12}$-alkenoxyalkyl, $C_4$–$C_{12}$-dialkylaminoalkyl, a group $-CH_2-CH(R^4)-OH$, benzyl or a group of the formula

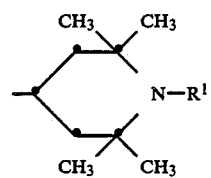

or of the formula

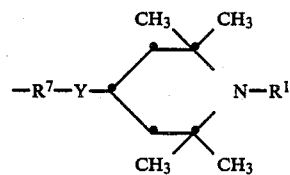

$R^6$ is hydrogen, $C_1$–$C_{12}$-alkyl, $C_3$–$C_7$-alkenyl, cyclohexyl, a group $-CH_2-CH(R^4)-OH$ or a group of the formula

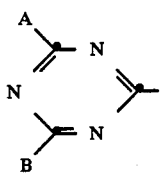

$R^7$ is $C_2$–$C_{12}$-alkylene which can be interrupted by 1, 2 or 3 of the groups —O— or —N($R^6$)—, $C_6$–$C_{14}$-cycloalkylene or cycloalkylenedialkylene, Y is a divalent group of the formula —O— or —N($R^6$)— and A and B, independently of one another, (a) are a group of the formula $R^8O$— or $(R^9)(R^{10})N$— in which $R^8$ is $C_1$–$C_{12}$-alkyl, $C_3$–$C_7$-alkenyl, $C_3$–$C_{12}$-alkoxyalkyl, $C_4$–$C_{12}$-dialkylaminoalkyl, cyclohexyl, benzyl, phenyl or $C_7$–$C_{12}$-alkylphenyl, $R^9$ is $C_1$–$C_{12}$-alkyl, $C_3$–$C_7$-alkenyl, $C_5$–$C_8$-cycloalkyl, $C_3$–$C_{12}$-alkoxyalkyl, $C_5$–$C_{12}$-alkenoxyalkyl, $C_4$–$C_{12}$-dialkylaminoalkyl, a group —$CH_2$—CH($R^4$)—OH, phenyl, $C_7$–$C_{12}$-alkylphenyl or $C_7$–$C_{11}$-phenylalkyl and $R^{10}$ is hydrogen, $C_1$–$C_{12}$-alkyl, $C_3$–$C_7$-alkenyl, $C_5$–$C_8$-cycloalkyl, $C_3$–$C_{12}$-alkoxyalkyl, $C_5$–$C_{12}$-alkenoxyalkyl, $C_4$–$C_{12}$-dialkylaminoalkyl, $C_2$–$C_{12}$-alkanoyl, $C_3$–$C_{12}$-alkenoyl, a group —$CH_2$—CH($R^4$)—OH or $C_7$–$C_{11}$-phenylalkyl, or $R^9$ and $R^{10}$, together with the N atom to which they are attached, form a 5-membered or 6-membered heterocyclic ring, or (b) are a group of the formula

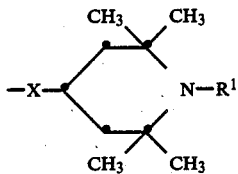

in which at least one of the groups $R^1$, $R^2$, $R^3$, $R^5$, $R^6$, $R^8$, $R^9$ or $R^{10}$ is an alkenyl or alkenoyl radical.

As alkyl, the substituents $R^1$, $R^2$, $R^4$, $R^5$, $R^6$, $R^8$, $R^9$ and $R^{10}$ can be unbranched or branched alkyl, preferably unbranched alkyl. Examples of alkyl groups of this type are methyl, ethyl, propyl, butyl, sec.-butyl, n-hexyl, n-octyl, 2-ethylhexyl, n-decyl or n-dodecyl.

As alkenyl, $R^1$, $R^5$, $R^6$, $R^8$ and $R^9$ can be unbranched or branched alkenyl, for example allyl, methallyl, 2-buten-1-yl, 2-methyl-2-buten-1-yl or 2-hexen-1-yl, allyl being preferred.

As cycloalkyl, $R^9$ can be, for example, cyclopentyl, cyclohexyl, 4-methylcyclohexyl, cycloheptyl or cyclooctyl, cyclohexyl being preferred.

As phenylalkyl, $R^1$, $R^9$ and $R^{10}$ can be, for example, butyl, 1-phenylethyl, 2-phenylethyl, 3-phenylpropyl or 3-phenylbutyl, benzyl being preferred.

As alkylphenyl, $R^2$, $R^8$ and $R^9$ can be, for example, 4-tolyl, 2-tolyl, 3,5-dimethylphenyl, 4-ethylphenyl or 4-isopropylphenyl, 4-tolyl being preferred.

As alkanoyl, $R^1$ can be, for example, acetyl, propionyl, butyryl, hexanoyl (capronyl), 2-ethylhexanoyl, n-octanoyl (capryloyl), n-decanoyl (caprinoyl), n-dodecanoyl (lauroyl), n-hexadecanoyl (palmitoyl) or n-octadecanoyl (stearoyl). As alkenoyl, $R^1$ can be, for example, acryloyl, methacryloyl, crotonyl, vinylacetyl or oleyl.

As alkoxymethyl, $R^4$ can be, for example, methoxymethyl, ethoxymethyl, butoxymethyl, hexyloxymethyl, octyloxymethyl or dodecyloxymethyl.

As alkoxyalkyl, $R^5$, $R^8$, $R^9$ and $R^{10}$ can be, for example, 2-methoxyethyl, 2-ethoxyethyl, 2-isopropoxyethyl, 2-butoxyethyl, 2-methoxypropyl, 4-methoxybutyl, 3-butoxypropyl or 2-octyloxyethyl. As alkenoxyalkyl, $R^5$ and $R^9$ can be, for example, 2-allyloxyethyl, 2-methallyloxypropyl or 3-allyloxypropyl.

As dialkylaminoalkyl, $R^5$, $R^8$, $R^9$ and $R^{10}$ can be, in particular, dialkylaminopropyl, for example 3-dimethylaminopropyl, 3-diethylaminopropyl or 3-diisopropylaminopropyl.

As alkylene or alkylene which is interrupted by —O— or —N($R^6$)—, $R^7$ can be, for example, 1,2-ethylene, 1,3-propylene, 1,4-butylene, 1,6-hexylene, 1,8-octylene, 2,4-dimethyl-1,6-hexylene, 1,12-dodecylene, 4-oxa-1,1-heptylene, 4-(methylaza)-1,7-heptylene or 4,8-diaza-1,11-undecylene.

As cycloalkylene or cycloalkylenedialkylene, $R^7$ can be, for example, 1,4-cyclohexylene, 1,5-cyclooctylene, 1,4-dimethylenecyclohexane or 3,3-dimethyl-5-methylenecyclohexyl.

Together with the N atom to which they are attached, $R^2$ and $R^3$ and also $R^9$ and $R^{10}$ can form a heterocyclic ring, for example a pyrrolidine, piperidine, morpholine or 4-methylpiperazine ring.

The following compounds of the formula I are preferred:

(1a) Compounds of the formula I in which at least two of the groups $R^1$, $R^2$, $R^3$, $R^5$, $R^6$, $R^8$, $R^9$ or $R^{10}$ are alkenyl or alkenoyl.

(1b) Compounds of the formula I in which the substituent A or the substituents A and B are a group $R^8O$— or $(R^9)(R^{10})N$— and $R^8$ and $R^9$ are $C_3$–$C_7$-alkenyl.

(1c) Compounds of the formula I in which A and B are a group of the formula $R^8O$— or $(R^9)(R^{10})N$— and $R^8$ and $R^9$ are allyl.

(1d) Compounds of the formula I in which A is a group $(R^{9'})(R^{10'})N$— in which $R^{9'}$ is $C_3$–$C_7$-alkenyl and $R^{10'}$ is $C_1$–$C_{12}$-alkyl, cyclohexyl, hydroxyethyl, benzyl, $C_2$–$C_{12}$-alkanoyl or $C_3$–$C_5$-alkenoyl.

(1e) Compounds of the formula I in which the substituents A and B are a group $R^8O$— or $(R^9)(R^{10})N$— in which $R^8$ and $R^9$ are allyl and X is a group —N($R^5$)— in which $R^5$ is a group of the formula

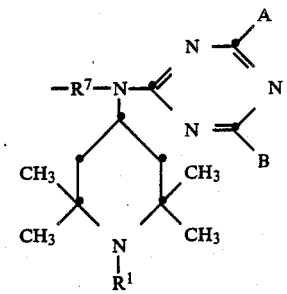

and $R^1$ and $R^7$ are as defined above.

(1f) Compounds of the formula I in which $R^1$ is $C_3$–$C_7$-alkenyl, $C_7$–$C_{11}$-phenylalkyl, cyanomethyl, $C_2$–$C_{18}$-alkanoyl, $C_3$–$C_{18}$-alkenoyl or —CON($R^2$)($R^3$).

2. A further particularly preferred class of piperidine-triazines is formed by the compounds of the general formula II

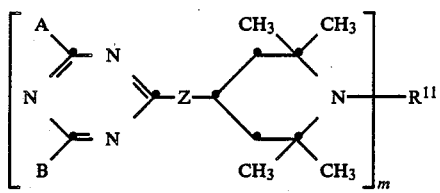

II in which m is 2, 3 or 4, $R^{11}$ is an m-valent radical and is $C_2$-$C_{12}$-alkylene, $C_4$-$C_8$-alkenylene, xylylene or a group —$CH_2$—$CH(OH)$—$CH_2$—, —$CH_2$—$CH(OH)$—$CH_2$—D—$CH_2$—, —$CH(OH)$—$CH_2$—, $+CH_2$—$CH(OH)$—$CH_2\}_3$T or $+CH_2$—$CH(OH)$—$CH_2\}_4$Q in which D is a radical —O—$R^{12}$—O— or —OOC—$R^{13}$COO— in which $R^{12}$ and $R^{13}$ are divalent aliphatic, cycloaliphatic, aromatic or araliphatic radicals, T is a trivalent aliphatic or heterocyclic group and Q is a tetravalent aliphatic group, Z is a divalent group of the formula —O— or —N($R^{14}$)— in which $R^{14}$ is hydrogen, $C_1$-$C_{12}$-alkyl, $C_3$-$C_7$-alkenyl, cyclohexyl, $C_2$-$C_4$-hydroxyalkyl, $C_3$-$C_{12}$-alkoxyalkyl, $C_5$-$C_{12}$-alkenoxyalkyl, $C_4$-$C_{12}$-dialkylaminoalkyl or benzyl, and A and B are as defined in formula I, the molecule containing at least one alkenyl or alkenoyl group.

In this formula, $R^{11}$ as alkylene can be, for example, 1,2-ethylene, 1,4-butylene, 1,6-hexylene or 1,12-dodecylene. As alkenylene, $R^{11}$ can, in particular, be 2-buten-1,4-ylene. As the radical —O—$R^{12}$—O—, D is the divalent radical of a diol, for example ethylene glycol, 1,2-propylene glycol, 1,4-butanediol, 1,4-butenediol, diethylene glycol, 1,6-hexanediol, cyclohexane-1,4-diol, hydroquinone, 4,4'-dihydroxybiphenyl, 2,2-diphenylolpropane, diphenylolmethane, xylylenediol or 1,4-dimethylolcyclohexane, the radical of 2,2-diphenylolpropane being preferred. As the radical —OOC—$R^{13}$—COO—, D is the divalent radical of a dicarboxylic acid, for example succinic, adipic, maleic, sebacic, phthalic, isophthalic, terephthalic or hexahydrophthalic acid.

As a trivalent group, T can be, for example, the trivalent radical of glycerol, trimethylolpropane, trimethylolethane or isocyanuric acid.

Q can, in particular, be the tetravalent radical of pentaerythritol, $C(CH_2O)_4$.

As alkyl, alkenyl, alkoxyalkyl, alkenoxyalkyl or dialkylaminoalkyl, $R^{14}$ can be as defined for $R^5$. As hydroxyalkyl, $R^{14}$ can be, for example, 2-hydroxyethyl, 2-hydroxypropyl or 2-hydroxybutyl.

The following compounds of the formula II are preferred:

(2a) Compounds containing at least two alkenyl or alkenoyl groups, (2b) compounds of the formula II in which A is a group of the formula $R^8O$— or $(R^9)(R^{10})N$— in which $R^8$ and $R^9$ are a $C_3$-$C_7$-alkenyl group and $R^{10}$ is as defined above, (2c) compounds of the formula II in which A and B are a group of the formula $R^8O$— or $(R^9)(R^{10})N$— and $R^8$ and $R^9$ are allyl.

3. A further particularly suitable class of piperidine-triazine compounds is formed by compounds of the formula III

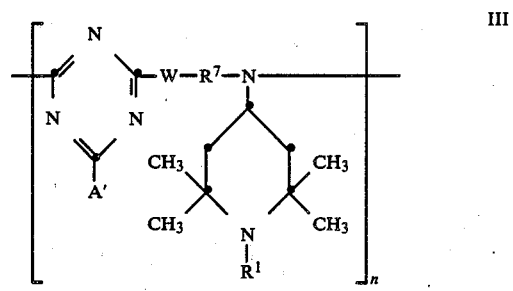

III in which n has a value from 2 to 20, A' is a group of the formula $R^8O$— or $(R^9)(R^{10})N$— in which $R^8$ and $R^9$ are $C_3$-$C_7$-alkenyl, W is a divalent group of the formula —O— or —N($R^{16}$)— in which $R^{16}$ is hydrogen, $C_1$-$C_{12}$-alkyl, $C_3$-$C_7$-alkenyl, cyclohexyl, benzyl or a group of the formula

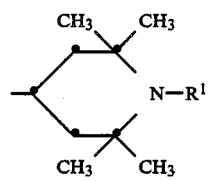

and $R^1$, $R^7$ and $R^{10}$ are as defined above. In this formula, $R^{16}$, as alkenyl, can be, for example, allyl, methallyl, 2-butenyl, 2-methyl-2-buten-1-yl or 2-hexan-1-yl, allyl being preferred. As alkyl, $R^{16}$ can be as defined for $R^6$.

The oligomeric compounds of the formula III can be linear or cyclic oligomers. Examples of cyclic oligomers are the cyclodimers of the formula IIIA

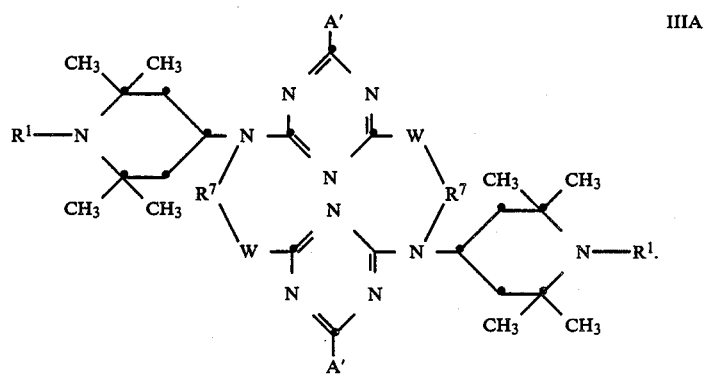

IIIA

It is also possible to use mixtures of linear and cyclic oligomers of the formula III.

(3a) Preferred compounds of the formula III are those in which A' is an allylamino or diallylamino group.

4. A further particularly suitable class of piperidine-triazine compounds is formed by compounds of the formula IV

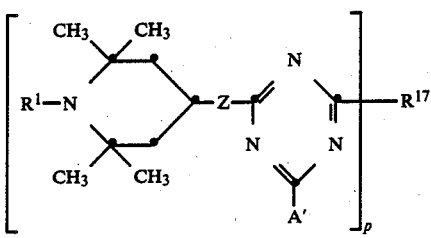

in which $R^1$ is as defined in formula I, Z is as defined in formula II, A' is as defined in formula III, p is 2, 3 or 4 and $R^{17}$ is the p-valent radical of a polyol or polyamine.

As a divalent radical, $R^{17}$ can be the radical of a diol or diamine, for example ethylene glycol, 1,2-propylene glycol, 1,4-butanediol, 1,4-butenediol, diethylene glycol, 1,6-hexanediol, hydroquinone, 2,2-diphenylolpropane, diphenylolmethane, xylylenediol, 1,4-dimethylolcyclohexane, ethylenediamine, 1,3-diaminopropane, tetramethylenediamine, hexamethylenediamine, octamethylenediamine, 1,3-diaminocyclohexane, 4,4'-diaminobiphenyl, 4,4'-diaminodiphenylmethane or 1,7-diamino-4-oxaheptane.

As a trivalent radical, $R^{17}$ can be the radical of a triol or triamine, for example glycerol, trimethylolpropane, triethanolamine, diethylenetriamine or dipropylenetriamine.

As a tetravalent radical, $R^{17}$ can be the radical of a tetrol or tetramine, for example pentaerythritol or triethylenetetramine.

(4a) Compounds of the formula IV which are preferred are those in which the substituent A' is an allyloxy, allylamino or diallylamino group.

(4b) Compounds of the formula IV which are also preferred are those in which A' is a group $(R^9)(R^{10})N-$ and $R^{10}$ is $C_1-C_{12}$-alkyl, cyclohexyl, hydroxyethyl, benzyl, $C_2-C_{12}$-alkanoyl or $C_3-C_5$-alkenoyl.

(4c) Compounds of the formula IV which are also preferred are those in which $R^1$ is $C_3-C_7$-alkenyl, $C_7-C_{11}$-phenylalkyl, cyanomethyl, $C_2-C_{18}$-alkanoyl, $C_3-C_{18}$-alkenoyl or $-CON(R^2)-(R^3)$.

The compounds of classes 1d, 1f, 2, 3, 4b and 4c are novel compounds and as such also form a subject of the invention. The preparation of compounds of classes 1d and 1f (formula I) can be effected analogously to the process of German Offenlegungsschrift No. 2,319,816. In this process, cyanuric acid chloride is reacted in stages with the components AH, BH and a 4-hydroxy-2,2,6,6-tetramethylpiperidine or 4-amino-2,2,6,6-tetramethylpiperidine. The introduction of a substituent $R^1$ onto the piperidine nitrogen can be effected before or after the reaction with the halogenotriazine.

The compounds of class 2 (formula II) can be prepared by the general methods indicated in European Patent A No. 3,542. In these methods, the radical $R^{11}$ is introduced by means of a dihalogeno, trihalogeno or tetrahalogeno compound or a diepoxy, triepoxy or tetraepoxy compound.

The compounds of class 3 (formula III) can be prepared by the process of German Offenlegungsschrift No. 2,636,144. In this process, cyanuric acid chloride is first reacted with 1 mole of a compound A'H and then with 1 mole of a bifunctional piperidine compound. By using an excess of the bifunctional component, the degree of polymerisation n can be kept low.

The compounds of classes 4b and 4c (formula IV) can be prepared by the method of German Offenlegungsschrift No. 2,636,130. In this method, cyanuric acid chloride is reacted in stages with a compound A'H, a 4-hydroxypiperidine or 4-aminopiperidine derivative and with a polyol or polyamine $R^{17}(H)_p$. The molar ratio of triazine to polyol or polyamine is p to 1. Further details relating to the preparation of these compounds can be seen in the preparation examples which follow later.

The piperidine-triazine compounds are added to the polymers in an amount of 0.01 to 5% by weight, preferably 0.1 to 1% by weight.

The addition is effected before the polymers are shaped, preferably by dry mixing with the polymer powder or polymer granules. The piperidine-triazine compound can also be added in the form of a master batch to the polymer. The free-radical former can be mixed in at the same time as the stabiliser, but it can also be added direct to the polymer melt. At the same time as the piperidine-triazine stabiliser is added, it is also possible to add other stabilisers or other additives, for example antioxidants, metal deactivators, phosphites, UV absorbers, metal carboxylates, lubricants, antistatic agents, flame-retarding agents, pigments, fillers or reinforcing substances. The additional use of phenolic antioxidants, in particular of derivatives of $\beta$-(3,5-di-t.-butyl-4-hydroxyphenyl)-propionic acid, for example the octadecyl ester or pentaerythrityl ester thereof, is of particular importance. The addition of oligomerised dihydroquinoline derivatives, for example the oligomer of trimethyldihydroquinoline, also increases the resistance of the polymers to ageing. If it is intended to crosslink the polymer, it is also possible to add crosslinking auxiliaries, for example triallyl cyanurate, diallyl terephthalate, triallyl trimellitate, ethylene glycol diacrylate or trimethylolpropane trimethacrylate.

If the reaction is carried out in the presence of a free-radical former, the grafting or crosslinking is effected by heating the polymer to a temperature at which the free-radical former decomposes at a sufficient rate. In certain cases it can be desirable to effect a certain reduction in the molecular weight of the polymer, at the same time as the grafting. A reduction of this kind can be achieved, in the case of polymers which respond to the treatment, by appropriate selection and metered addition of the free-radical former and by suitable temperature control.

If the grafting or crosslinking is effected by irradiation, this is preferably carried out at room temperature and after the polymer has been shaped.

Various industrial processes exist for the continuous crosslinking of plastic articles, for example cable insulation, tubes or sheeting. All these processes are also suitable for the process according to the invention.

It is known that an undesirable formation of bubbles in the polymer can occur in free-radical crosslinking reactions of this type as the result of simultaneous side reactions. The stabilisers according to the invention reduce these side reactions and thus the formation of bubbles.

The addition of the piperidine-triazine derivatives for crosslinking polymers not only produces long-lasting stabilisation of the polymer but also makes it possible to reduce the quantity of free-radical former required. Altogether, the process according to the invention is particularly suitable and particularly important for crosslinkable thermoplastics.

The polymers which have been stabilised by the process according to the invention have a high resistance to photochemical degradation. This was to be expected from the content of tetraalkylpiperidine groups in the stabilisers. Surprisingly, however, the polymers thus stabilised also have a high thermo-oxidative stability, such as can otherwise only be achieved by adding antioxidants. In individual cases, the action of the commercially available antioxidants is even exceeded.

The examples which follow illustrate the process according to the invention in greater detail without limiting it to the examples, and describe the preparation of individual stabilisers which can be used for this purpose. All the temperature data relate to degrees centigrade.

which melts at 138°–40° C.; analysis: $C_{30}H_{48}N_{10}Cl_4$ (690.6) Cl calculated 20.56%; found 20.53%.

(b) A mixture of 27.6 g (0.04 mole) of the above tetrachloride and 60 g (1.05 mole) of allylamine is heated at 130° C. for 24 hours in an autoclave, while stirring, a pressure of 7 bar being set up. After cooling, the excess allylamine is removed by vacuum distillation, the residue is taken up in 300 ml of chloroform and the cloudy solution is washed once with 100 ml of 20% sodium hydroxide solution and with three times 50 ml of water. The solution, which is now clear, is dried over $Na_2SO_4$ and evaporated. The crude product (25 g) obtained as the residue crystallises on standing. It is purified by being dissolved in 250 ml of hot ligroin (boiling point 110°–140°), stirring the solution with 4 g of silica gel and filtering the mixture while hot. The product which crystallises on cooling is filtered off and dried in vacuo at 60°. The resulting N,N'-bis-[2,4-di-(allylamino)-1,3,5-triazin-6-yl]-N,N'-bis-(2,2,6,6-tetramethylpiperid-4-yl)-hexamethylenediamine of the formula

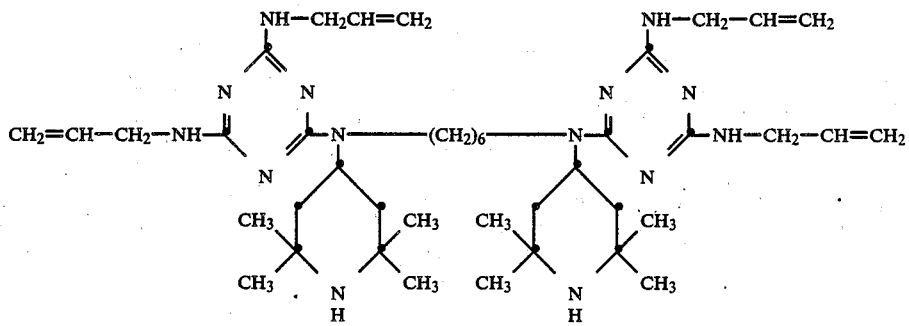

PREPARATION OF THE STABILISERS

Example 1

(a) A solution of 198.8 g (0.5 mole) of N,N'-bis-(2,2,6,6-tetramethylpiperid-4-yl)-hexamethylenediamine in 500 ml of acetone is added dropwise, in the course of 2½ hours and while stirring, to a solution of 184.4 g (1 mole) of cyanuric acid chloride in 1 liter of acetone. In the course of the addition the temperature is kept at 0° to 5° C. After the dropwise addition, stirring is continued for a further 4 hours at this temperature. A solution of 40 g of NaOH in 160 ml of water is added, with ice cooling, and the mixture is stirred for a further 15 minutes. The reaction solution is neutralised and poured into 1 liter of ice water, and the precipitated product is filtered off and dried in a desiccator. This gives 347 g of the tetrachloro compound of the formula

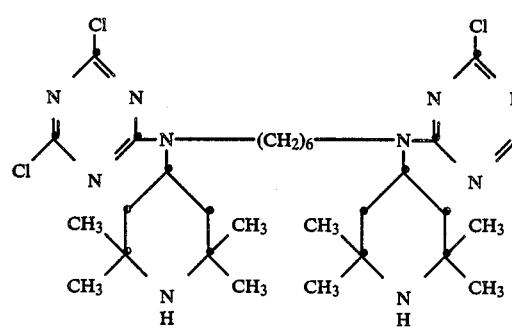

melts at 162°–63° (stabiliser No. 1).

Analysis: $C_{42}H_{72}N_{14}$, (773.14): calculated: C, 65.25%; H, 9.39%; N, 25.36%. found: C, 65.4%; H, 9.4%; N, 25.5%.

The following are prepared analogously:
2,4-bis-[N-(2,2,6,6-tetramethylpiperid-4-yl)-butylamino]-6-allylamino-1,3,5-triazine, melting point 101°–103° (stabiliser No. 2),
N,N'-bis-[2,4-bis-(diallylamino)-1,3,5-triazin-6-yl]-N,N'-bis-(2,2,6,6-tetramethylpiperid-4-yl)-hexamethylenediamine, melting point 124°–125° (stabiliser No. 3),
2,4-bis-(diallyamino)-6-[N-(2,2,6,6-tetramethylpiperid-4-yl)-butylamino]-1,3,5-triazine, viscous oil, boiling point 230°/0.1 Pa (stabiliser No. 4),
N,N'-bis-[2,4-di-(allyloxy)-1,3,5-triazin-6-yl]-N,N'-bis-(2,2,6,6-tetramethylpiperid-4-yl)-hexamethylenediamine, melting point 112°–113° (stabiliser No. 5),
2-di-(2,2,6,6-tetramethylpiperid-4-yl)-amino-4,6-diallylamino-1,3,5-triazine, melting point 74°–75° (stabiliser No. 6) and the compound of the formula

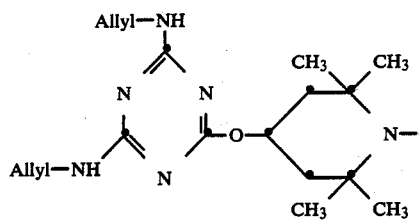
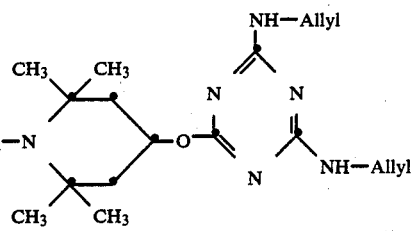

melting point 239°–240° (stabiliser No. 7).

Example 2

54.9 g (0.96 mole) of allylamine are added dropwise, in the course of 1.5 hours and while stirring, to a clear solution of 73.8 g (0.4 mole) of cyanuric chloride in 500 ml of toluene, the temperature being kept between 20° and 30° by applying gentle external cooling to the reaction vessel. After stirring for a further two hours at room temperature and for one hour at 50°, the mixture is cooled to 20°, and a solution of 16 g (0.4 mole) of sodium hydroxide in 70 ml of water is added dropwise at 20° in the course of 2 hours. After stirring for a further 2 hours at room temperature and for 6 hours at 60°, a further 16 g (0.4 mole) of sodium hydroxide in 70 ml of water are added dropwise in the course of 2 hours and stirring is continued for a further 5 hours at 60°. After the mixture has cooled to room temperature, 200 ml of water are added, and the precipitate is filtered off after stirring for approx. 30 minutes. The precipitate is thoroughly washed with water, thoroughly suction-drained and dried in vacuo at approx. 95°. The colourless 2,4-bis-allylamino-6-chloro-1,3,5-triazine thus obtained is analytically pure and has a melting point of 205°–206°; its water content is <0.3%. Yield 88.2 g (97.7% of theory).

Analysis: $C_9H_{12}N_5Cl$, (225.7): calculated: C, 47.90%; H, 5.36%; N, 31.03%; Cl, 15.70%. found: C, 47.9%; H, 5.5%; N, 31.3%; Cl, 15.6%.

The following are prepared analogously:
2-allylamino-4-[N-(2,2,6,6-tetramethylpiperid-4-yl)-butylamino]-6-chloro-1,3,5-triazine, melting point 143°–144°,
2-allylamino-4-[N-(2,2,6,6-tetramethylpiperid-4-yl)-octylamino]-6-chloro-1,3,5-triazine, melting point ~50°,
2,4-bis-[N-(2,2,6,6-tetramethylpiperid-4-yl)-butylamino]-6-chloro-1,3,5-triazine, melting point 117°–118°,
2,4-bis-(diallylamino)-6-chloro-1,3,5-triazine, boiling point 155°/0.01 and
2-diallylamino-4-[N-(2,2,6,6-tetramethylpiperid-4-yl)-butylamino]-6-chloro-1,3,5-triazine, boiling point 210°/0.06.

46.5 g (0.206 mole) of 2,4-bis-allylamino-6-chloro-1,3,5-triazine and 39.5 g (0.1 mole) of N,N'-bis-(2,2,6,6-tetramethylpiperid-4-yl)-hexamethylenediamine are dissolved rapidly by stirring in 200 ml of xylene in an atmosphere of nitrogen, a clear solution being formed initially. A precipitate of the hydrochlorides begins to form after approx. 10–15 minutes. The mixture is stirred for a further 2.5 hours at reflux temperature. A total of 8.8 g (0.22 mole) of finely powdered solid sodium hydroxide is then added in 5 portions in the course of 5 hours, and stirring is continued for a further 10 hours at reflux temperature. The reaction mixture is worked up by being filtered while hot (approx. 125°) through a preheated suction filter, the residue is washed with a little warm xylene, and the filtrate is induced to crystallise by stirring and cooling (0°–5°). The crystalline precipitate is filtered off and recrystallised from special boiling point gasoline (boiling point 110°–140°), which gives N,N'-bis-[2,4-di-(allylamino)-1,3,5-triazin-6-yl]-N,N'-bis-(2,2,6,6-tetramethylpiperid-4-yl)-hexamethylenediamine of melting point 161°–163°. This product is identical with the product prepared in accordance with Example 1b) (stabiliser No. 1).

The following are prepared analogously:
N,N'-bis-[2,4-di-(allylamino)-1,3,5-triazin-6-yl]-N,N'-bis-(2,2,6,6-tetramethylpiperid-4-yl)-1,2-diaminoethane, melting point 211°–212° (stabiliser No. 8), and the compounds of the formulae

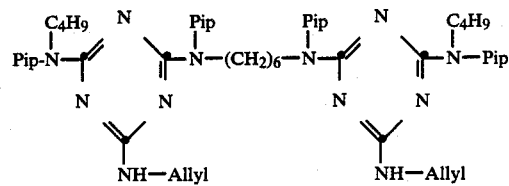

melting point 198°–200° (stabiliser No. 9),

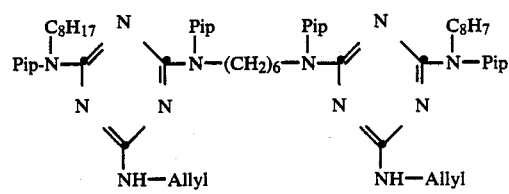

melting point 117°–119° (stabiliser No. 10),

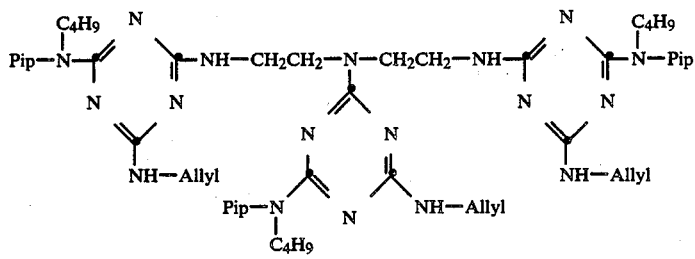

melting point about 102° (stabiliser No. 11),

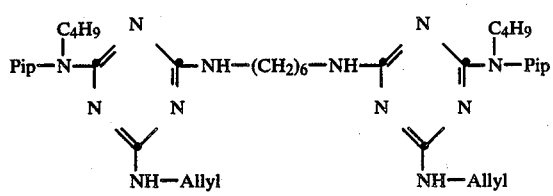

melting point 130°-131° (stabiliser No. 12),

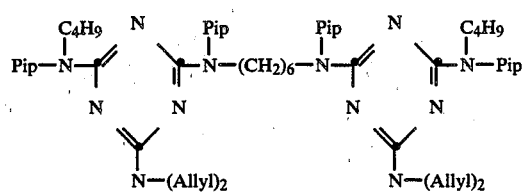

melting point 151°-159° (stabiliser No. 13).

In these formulae, Pip is a 2,2,6,6-tetramethylpiperid-4-yl radical.

Example 3

18.05 g (0.08 mole) of 2,4-bis-allylamino-6-chloro-1,3,5-triazine and 14.74 g (0.08 mole) of 2-(2,2,6,6-tetramethylpiperid-4-yl)-ethylamine in 130 ml of xylene are heated at reflux temperature for 4 hours, while stirring. 3.5 g (0.088 mole) of finely powdered sodium hydroxides are then added to the reaction mixture in 4 portions over a period of 4 hours, and the mixture is kept at reflux temperature overnight. The reaction mixture is then freed from the precipitated sodium chloride by filtration while hot, the xylene is completely removed by vacuum distillation, and the residue is recrystallised from n-pentane. The 2,4-bis-allylamino-6-[2-(2,2,6,6-tetramethylpiperid-4-yl)-ethylamino]-1,3,5-triazine thus obtained has a melting point of 74°-75° (stabiliser No. 14).

Analysis: $C_{20}H_{35}N_7$, (373.55): calculated: C, 64.31%; H, 9.44%; N, 26.25%. found: C, 64.3%; H, 9.6%; N, 26.0%.

The following are prepared analogously:

2,4-bis-allylamino-6-[N-(2,2,6,6-tetramethylpiperid-4-yl)-butylamino]-1,3,5-triazine, boiling point 215°/0.01 (stabiliser No. 15), 2,4-bis-allylamino-6-(2,2,6,6-tetramethylpiperid-4-ylamino)-1,3,5-triazine, melting point 87°-89° (stabiliser No. 16), 2-diallylamino-4,6-bis-[N-(2,2,6,6-tetramethylpiperid-4-yl)-butylamino]-1,3,5-triazine, melting point 98°-100° (stabiliser No. 17), 2-diallylamino-4,6-bis-(2,2,6,6-tetramethylpiperid-4-ylamino)-1,3,5-triazine, melting point 97°-98° (stabiliser No. 18), 2-diallylamino-4,6-bis-[N-(2,2,6,6-tetramethylpiperid-4-yl)-methylamino]-1,3,5-traizine, melting point 92°-93° (stabiliser No. 19), 2-diallylamino-4,6-bis-[N-(2,2,6,6-tetramethylpiperid-4-yl)-ethylamino]-1,3,5-triazine, melting point 129°-130° (stabiliser No. 20), 2-diallylamino-4,6-bis-[N-(2,2,6,6-tetramethylpiperid-4-yl)-isopropylamino]-1,3,5-triazine, melting point 219°-220° (stabiliser No. 21) and 2,4-bis-(diallylamino)-6-(1,2,2,6,6-pentamethylpiperid-4-ylamino)-1,3,5-triazine, boiling point 230°-235°/0.06 (stabiliser No. 22).

Example 4

(A) 700.8 g (0.3 moles) of 4-n-butylamino-2,2,6,6-tetramethylpiperidine and 1,500 ml of water are initially taken in a reaction flask. This suspension is cooled to approx. 2° and 184.2 g (1.0 mole) of cyanuric chloride are introduced while stirring (anchor stirrer) in the course of approx. 30 minutes at 0°-5° (external cooling). After the mixture has been stirred for a further 30 minutes at 0°-5°, a solution of 40 g (1.0 mole) of sodium hydroxide in 50 ml of water is added dropwise in the course of 15 minutes, and stirring is continued for a further 2 hours at 0°-5°. The reaction mixture is then kept at 40° for approx. 30 minutes; after this time a further solution of 40 g (1.0 mole) of sodium hydroxide in 50 ml of water is added, and the mixture is kept at 40° for a further 2 hours. The mixture is then heated at reflux temperature for 30 minutes, a further solution of 40 g (1.0 mole) of sodium hydroxide in 50 ml of water is added, and the reaction is completed at reflux temperature in the course of a further 12 hours. The triazine compound is isolated by adding 800 ml of toluene to the reaction mixture and separating off the toluene phase after stirring for 30 minutes. The toluene solution is washed twice with water and dried over sodium sulfate, and the solvent is removed by vacuum distillation. The residue is recrystallised from acetonitrile, which gives 2,4,6-tris-N-(2,2,6,6-tetramethylpiperid-4-yl)-butylamino-1,3,5-triazine of melting point 166°-167°.

Analysis: $C_{42}H_{81}N_9$: calculated: C, 70.84%; H, 11.47%; N, 11.70%. found: C, 70.8%; H, 11.5%; N, 11.9%.

(B) A reaction mixture compound of 42.7 g (0.06 mole) of 2,4,6-tris-N-(2,2,6,6-tetramethylpiperid-4-yl)-butylamino-1,3,5-triazine, 43.6 g (0.36 mole) of allylbromide, 27.7 g (0.2 mole) of potassium carbonate, 2 g of finely powdered potassium iodide and 150 ml of ethyl methyl ketone is stirred (anchor stirrer) for 32 hours at reflux temperature in an $N_2$ atmosphere. The reaction mixture is worked up by being filtered while warm, the filter residue is thoroughly washed with methylene dichloride, and the solvents are completely removed by vacuum distillation from the combined filtrates. The residue is recrystallised from acetonitrile/ethyl methyl ketone (approx. 1:1) and then from pure acetonitrile, which gives pure 2,4,6-tris-[N-(1-allyl-2,2,6,6-tetramethylpiperid-4-yl)-butylamino]-1,3,5-triazine of melting point 161°–163° (stabiliser No. 23).

Analysis: $C_{51}H_{93}N_9$, (832.3): calculated: C, 73.59%; H, 11.26%; N, 15.15%. found: C, 73.4%; H, 11.5%; N, 15.2%.

The $^1$H-NMR spectrum is in agreement with the structure.

2-Diallylamino-4,6-bis-[N-(1-allyl-2,2,6,6-tetramethylpiperid-4-yl)-butylamino]-1,3,5-triazine, melting point 103°–104° (stabiliser No. 24), is prepared analogously from stabiliser No. 17 by reaction with excess allyl bromide.

2,4,6-Tris-(1-allyl-2,2,6,6-tetramethylpiperid-4-yloxy)-1,3,5-triazine, melting point 218°–219° (stabiliser No. 25) is prepared analogously from 2,4,6-tris-(2,2,6,6-tetramethylpiperid-4-yloxy)-1,3,5-triazine.

2,4,6-Tris-[N-(1-allyl-2,2,6,6-tetramethylpiperid-4-yl)-allyl-oxycarbonylmethylamino]-1,3,5-triazine, which softens at about 55°, (stabiliser No. 26), is prepared analogously from 2,4,6-tris-[N-(2,2,6,6-tetramethylpiperid-4-yl)-allyl-oxycarbonylmethylamino]-1,3,5-triazine.

Example 5

A mixture of 12.1 g (0.035 mole) of 2,4-bis-allylamino-6-(2,2,6,6-tetramethylpiperid-4-ylamino)-1,3,5-triazine (melting point 87°–89°) and 6.07 g (0.0175 mole) of pure bisphenol A 4,4'-diglycidyl ether is heated at 110°–115° for 31 hours, under nitrogen and with stirring. The reaction mixture is then cooled to room temperature and dissolved in methylene dichloride, the solution is washed with three times 20 ml of water and treated with active charcoal, and the solvent is removed by distillation. The crude compound is purified further by chromatography over silica gel 60 (Merck, particle size 0.04–0.063 mm) (mobile phase: 9:1 ether/methanol), which gives the compound of the structure Analysis: $C_{57}H_{86}N_{14}O_4$, (1,031.35): calculated: C, 66.38%; H, 8.42%; N, 19.00%. found: C, 66.5%; H, 8.6%; N, 18.7%.

0.1 mole of triglycidyl isocyanurate is reacted analogously with 0.15 mole of diallylamine and 0.15 mole of 2,2,6,6-tetramethylpiperidine. A mixture of products which softens at 40° is obtained (stabiliser No. 28).

Example 6

(A) 17.2 g (0.3 mole) of anhydrous allylamine are added dropwise, in the course of one hour, at 30°–40° and while stirring, to a solution of 103.6 g (0.15 mole) of N,N'-bis-(2,4-dichloro-1,3,5-triazin-6-yl)-N,N'-bis-(2,2,6,6-tetramethylpiperid-4-yl)-hexamethylenediamine in 500 ml of toluene. A solution of 12.0 g (0.3 mole) of sodium hydroxide in 100 ml of water is then added at approx. 30°, and stirring is continued for a further 19 hours at 50°. The mixture is worked up by separating off the aqueous phase in a separating funnel, washing the organic phase with three times 200 ml of water, drying it over sodium sulfate and removing the solvent by vacuum distillation. The solid residue is recrystallised from ethyl methyl ketone, which gives pure N,N'-bis-(2-chloro-4-allylamino-1,3,5-triazin-6-yl)-N,N'-bis-(2,2,6,6-tetramethylpiperid-4-yl)-hexamethylenediamine of melting point 210°–211°.

Analysis: $C_{36}H_{60}N_{12}Cl_2$, (731.87): calculated: C, 59.08%; H, 8.26%; N, 22.97%; Cl, 9.69%. found: C, 59.2%; H, 8.3%; N, 22.9%; Cl, 9.8%.

(B) 21.95 g (0.03 mole) of the above dichloride and 11.84 g (0.03 mole) of N,N'-bis-(2,2,6,6-tetramethylpiperid-4-yl)-hexamethylenediamine in 150 ml of xylene are heated at 130°–135° for 2.5 hours. A total of 2.8 g (0.07 mole) of finely powdered sodium hydroxide is then added at this temperature in 4 portions and intervals of time of 1 hour each, and stirring is continued for a further 16 hours at reflux temperature. The reaction mixture—a white suspension—is then filtered while warm, and the filter residue is treated further as indicated under (C).

The xylene is removed from the clear filtrate by vacuum distillation, the residue is diluted with 10 ml of diethyl ether, and this solution is poured slowly, at room temperature and with vigorous turbine stirring, into 300 ml of acetonitrile. The resulting precipitate is filtered off and dried in vacuo.

This gives the oligoaminotriazine of the formula

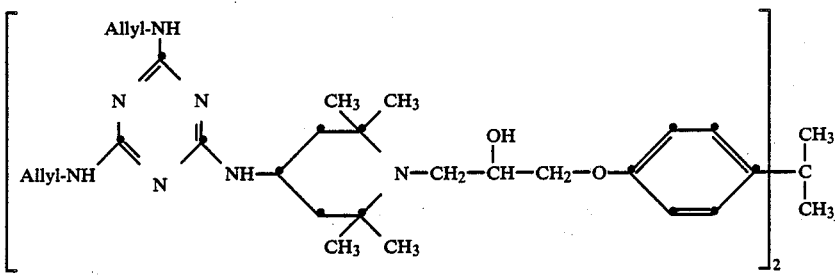

in the form of a mixture of diastereoisomers, which softens at about 120° (stabiliser No. 27).

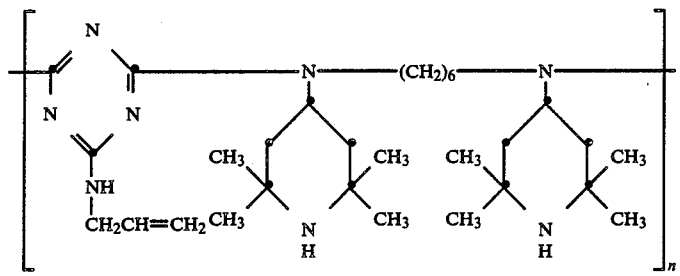

which softens at approx. 140° and has an average molecular weight $\overline{M}_n$ of 2,800 (stabiliser No. 29).

Analysis: $(C_{30}H_{54}N_8)_n$, $(526.8)_n$: calculated: N, 21.27%. found: N, 21.0%.

(C) The white filter residue mentioned above is washed thoroughly, first with cold methylene chloride and, after drying, with water. The residue is then dissolved in hot dimethylacetamide, and the solution is filtered and induced to crystallise. The resulting crystals do not melt below 350° and have the following macrocyclic structure (stabiliser No. 30).

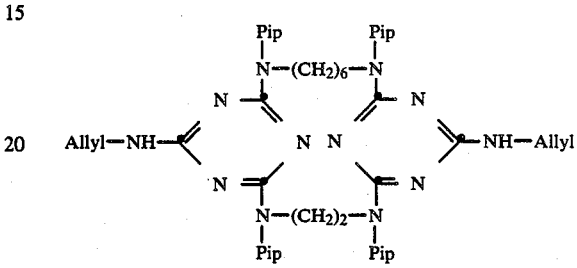

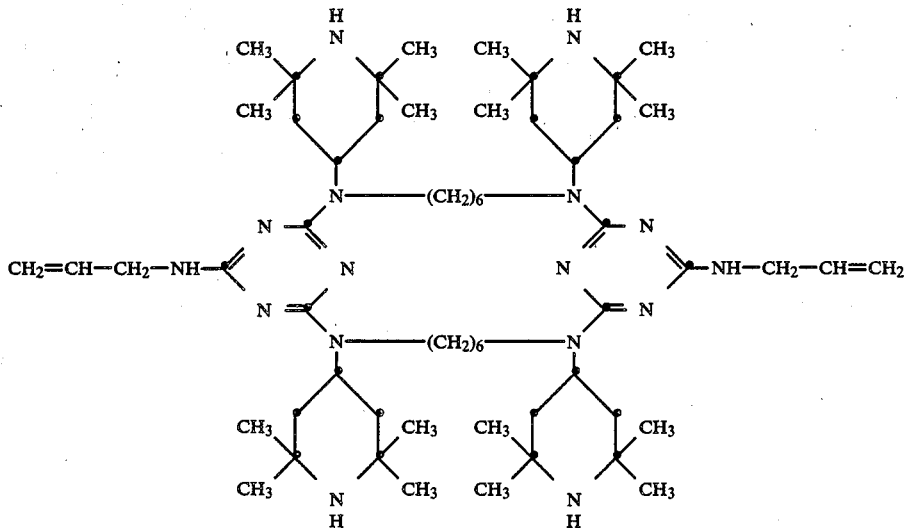

Analysis: $C_{60}H_{108}N_6$, (1,053.64): calculated: C, 68.40%; H, 10.33%; N, 21.27%. found: C, 68.1%; H, 10.5%; N, 21.2%.

The oligomer of the formula

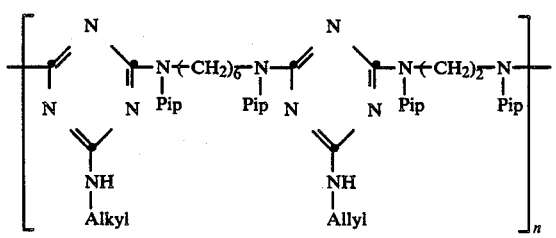

which softens at 210° and has an $\overline{M}_n$ of 5,200 (stabiliser No. 31) and also the corresponding cyclic dimer which does not melt below 340° (stabiliser No. 32) are obtained analogously from the dichloride described under (A) and N,N'-bis-(2,2,6,6-tetramethylpiperid-4-yl)-ethylenediamine.

In these formulae Pip is a 2,2,6,6-tetramethylpiperid-4-yl radical.

Example 7

A solution of 23.2 g (0.03 mole) of stabiliser No. 1 in 150 ml of acetic anhydride is heated at 90° for 24 hours in an atmosphere of nitrogen and with stirring. The excess acetic anhydride is then removed completely by vacuum distillation and the crude product is purified further by column chromatography over silica gel 60 (Merck/0.04–0.063 mm) (mobile phase: 96:4 diethyl ether/methanol) and is recrystallised from 9:1 ligroin/toluene, which gives pure N,N'-bis-[2,4-bis-(N-acetylallylamino)-1,3,5-triazin-6-yl]-N,N'-bis-(1-acetyl-2,2,6,6-tetramethylpiperid-4-yl)-hexamethylenediamine of melting point 139°–140° (stabiliser No. 33).

Analysis: $C_{54}H_{84}N_{14}O_6$, (1,025.3): calculated: C, 63.25%; H, 8.25%; N, 19.13%. found: C, 63.2%; H, 8.3%; N, 19.2%.

The $^1$H-NMR spectrum is in agreement with the structure indicated.

The corresponding O-acetyl derivative is obtained in the form of a soft resin (stabiliser No. 34) by treating stabiliser No. 28 analogously with excess acetic anhydride.

Example 8

A solution of 18.9 (0.21 mole) of freshly distilled acryloyl chloride in 20 ml of methylene chloride is added dropwise, in the course of approx. 5 hours at $-10°$ to $-5°$ and with stirring ($N_2$ atmosphere), to a solution of 23.2 g (0.03 mole) of stabiliser No. 1, 33.5 ml (0.24 mole) of triethylamine and 0.1 g of 2,6-di-tert.-butyl-p-cresol in 160 ml of methylene chloride, and stirring is continued for approx. 24 hours further at $-5°$. The reaction mixture is then warmed to room temperature, 150 ml of hexane are added and the precipitated triethylamine hydrochloride is filtered off. The filtrate is washed successively with water, 20% potassium carbonate solution and again with water, the organic phase is dried over sodium sulfate, and the solvent is removed by vacuum distillation. The crude product is purified further by chromatography over silica gel 60 (Merck/0.04–0.063 mm) (mobile phase: 9:1 diethyl ether/hexane) and is then recrystallised from diisopropyl ether, which gives N,N'-bis-[2,4-bis-(N-acryloylallylamino)-1,3,5-triazin-6-yl]-N,N'-bis-(1-acryloyl-2,2,6,6-tetramethylpiperid-4-yl)-hexamethylenediamine of melting point 78°–80° (stabiliser No. 35).

The $^1$H-NMR spectrum (220 MHz) is in agreement with the structure indicated.

USE OF THE STABILISERS

Example A

Crosslinking low-density polyethylene 26 g of polyethylene having a density of 0.926–0.929 and a melt index of 0.15–0.30 at 190° and 2.16 kg are mixed with 0.4% by weight of stabiliser No. 1 described in Example 1 and plasticised for 5 minutes at 125° C. in a Brabender Plastograph. Corresponding samples with no added stabiliser are prepared as a comparison. When plasticisation is complete, a further 12 g of polyethylene are added, together with dicumyl peroxide as a free-radical former, and the mixture is kneaded for a further 5 minutes at 125° C. The amount of peroxide is shown in Table 1.

The polymer is then taken out of the mixing chamber of the plastograph and compressed in a heated press at 125° to give a sheet 1 mm thick. This is then crosslinked in a second press at a higher temperature. After a specific time, the sheet is cooled in a third press.

Test specimens in the shape of a dumbbell are punched out of this sheet as specified in DIN 52,504.

The degree of crosslinking is determined by exposing 3 test specimens of each sample to a tensile force of 0.8N ($=20N/cm^2$) for 15 minutes at 200° in an oven, and measuring the resulting elongation. The test specimens are then heated at 200° for 5 minutes without load. The elongation remaining after this is also measured. If the elongation under tensile force under these conditions is less than 175% and is less than 5% after removing the load, the crosslinking is satisfactory. This test is known as "hot set".

Resistance to ageing is determined by hanging the test specimens in an oven heated at 150° with circulating air and subjecting them at regular intervals to a force/elongation test. The number of days after which the elongation at tear has fallen to half its initial value is shown in Table 1.

This test for resistance to ageing is also carried out with the test specimens which have been extracted with boiling chloroform for 5 days.

TABLE 1

Crosslinking low-density polyethylene with dicumyl peroxide

| 1. Additives | | | | | |
|---|---|---|---|---|---|
| Stabiliser No. 1 | — | — | 0.4% | — | 0.4% |
| Dicumyl peroxide | 2% | 1.4% | 1.4% | 2% | 1.4% |
| 2. Crosslinking | | | | | |
| Time in minutes | 15 | 15 | 15 | 2 | 2 |
| Temperature | 180° C. | 180° C. | 180° C. | 210° C. | 210° C. |
| 3. Results | | | | | |
| 3.1 hot set | | | | | |
| Elongation under load | 120% | ∞ | 55% | 101% | 110% |
| Residual elongation after removal of the load | 5% | — | 0% | 2% | 0% |
| 3.2 Ageing test at 150° C. | | | | | |
| Time required for elongation at tear to fall to 50% of its initial value (days) | <1 | <1 | 42 | <1 | 42 |
| The same after extraction with chloroform for 5 days | <1 | <1 | 14 | <1 | 14 |
| 3.3 Appearance | good | good | good | small bubbles | good |

Test specimens of the samples crosslinked with stabiliser 1 were analysed for nitrogen before and after extraction with $CHCl_3$. It was then found that the nitrogen content before and after extraction was virtually the same, which is a proof that the stabiliser has been chemically incorporated.

If, however, the corresponding saturated piperidine-triazine compound of the formula

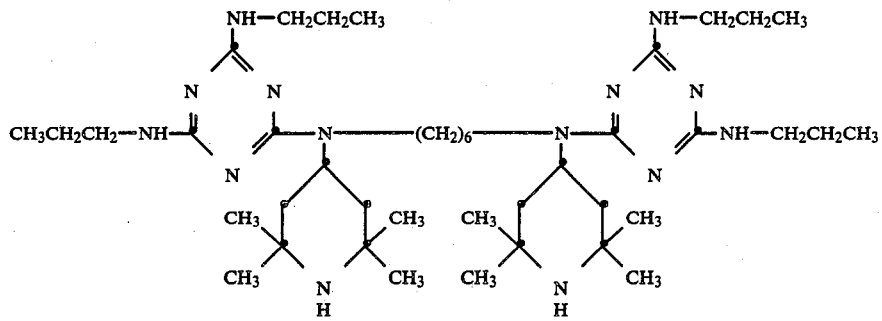

is used instead of stabiliser No. 1, the stability on ageing is largely lost after extraction and the nitrogen content falls back to 20–30% of its initial value as a result of the extraction.

Example B

Grafting a monoallyl compound

Low-density polyethylene is compressed analogously to Example A with 2% of dicumyl peroxide and 0.4% of stabiliser No. 2

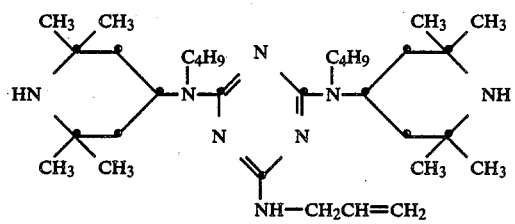

for 10 minutes at 125° and is crosslinked at 180° for 15 minutes. The sheets thus obtained have a nitrogen content of 780 ppm. After 7 days' extraction with boiling chloroform, the nitrogen content is 630 ppm, corresponding to 80% of the initial value.

Example C

Crosslinking Low-density polyethylene

The procedure of Example A is repeated, except that the free-radical former used is ethyl O-benzoyl-dodecanehydroximate, a compound of the formula

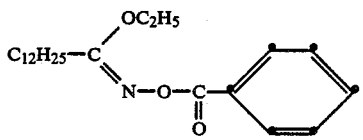

and triallyl cyanurate is added as an additional crosslinking auxiliary. The sheets are compressed at 125° and are then heated at 240° for 10 minutes to bring about crosslinking.

The following are added: 0.4% of stabiliser No. 1, 1% of triallyl cyanurate and 2% of ethyl O-benzoyl-dodecane-hydroximate.

The resistance to ageing is tested by determining the elongation at tear after ageing for 14 and 28 days at 150° in a circulating air oven. It is:

| | |
|---|---|
| before ageing, | 214 mm for a distance of 45 mm between clamps |
| after 14 days' ageing, | 201 mm for a distance of 45 mm between clamps |
| after 28 days' ageing, | 225 mm for a distance of 45 mm between clamps |

A comparison sample without stabiliser No. 1 was treated in the same manner and had the following elongation at tear:

| | |
|---|---|
| before ageing, | 145 mm for a distance of 45 mm between clamps |
| after 14 days' ageing, | 19 mm for a distance of 45 mm between clamps |
| after 28 days' ageing, | 13 mm for a distance of 45 mm between clamps |

Example D

Crosslinking high-density polyethylene.

26 g of polyethylene having a density of 0.949–0.953 and a melt index of 1.0–2.3 at 190° and 21.9 kg are mixed with the stabilisers mentioned in Table 2 and plasticised for 5 minutes at 200° C. in a Brabender plastograph. A further 12 g of polyethylene together with the amounts of 2,2-azobis(2-acetoxypropane), as free-radical former, listed in Table 2, are added to the plasticised mixture, which is kneaded for a further 5 minutes at 200° C. The plasticised polymer is compressed in a heated press at 200° to give a sheet 1 mm thick, which is then crosslinked at a higher temperature in a second press. The time and temperature of crosslinking are shown in Table 2. The sheet is then cooled in a third press.

Chips 0.05 mm thick and 1 mm wide are cut off this sheet by means of a microtome, and 0.5 g of the chips is weighed into a small cage made of stainless steel gauze. The cage is closed and extracted for 24 hours in boiling toluene, stabilised with 1% of bis-(2-hydroxy-3-tert.-butyl-5-methylphenyl)-methane. The cage is hung up for the toluene to drip off, first at 100° and then at room temperature, and is dried in vacuo and weighed. The undissolved residue of polymer corresponds to the crosslinked fraction. It is shown in Table 2 as a percentage of the amount of polyethylene chips employed.

The resistance to ageing is determined by the procedure of Example A.

TABLE 2

| Crosslinking high-density polyethylene with 2,2-azobis-(2-acetoxypropane) | | | | | | | |
|---|---|---|---|---|---|---|---|
| 1. Additives | | | | | | | |
| Stabiliser No. 1 | — | — | — | 0.4 | 0.4 | 0.4 | 0.4 |
| 2,2-Azobis-(2-acetoxypropane) | 1.5 | 1.0 | 0.8 | 0.8 | 0.5 | 0.8 | 0.5 |
| Irganox(R) 1010[1] | — | — | — | — | — | 0.1 | 0.1 |
| Irganox(R) 1076[2] | 0.25 | 0.25 | 0.25 | 0.25 | 0.25 | — | — |
| Irgafos(R) 168[3] | 0.2 | 0.2 | 0.2 | 0.2 | 0.2 | 0.2 | 0.2 |
| 2. Crosslinking | | | | | | | |
| Time in minutes | 6 | 6 | 6 | 6 | 6 | 6 | 6 |
| Temperature, °C. | 260 | 260 | 260 | 260 | 260 | 260 | 260 |
| 3. Results | | | | | | | |
| 3.1 Degree of crosslinking (residue after toluene extraction) | 71.8% | 55.9% | 0% | 71% | 61.7% | 71.9% | 67.4% |
| 3.2 Ageing test at 150° C. Time required for elongation at tear to fall to 50% of its initial value (days) | <7 | <7 | <7 | 49 | 49 | 35 | 49 |

[1] Pentaerythritol tetrakis-[β-(4-hydroxy-3,5-di-tert.-butylphenyl)-propionate]
[2] Octadecyl β-(4-hydroxy-3,5-di-tert.-butylphenyl)-propionate
[3] Tris-(2,4-di-tert.-butylphenyl) phosphite

Example E

Crosslinking low-density polyethylene

Polyethylene having a density of 0.926–0.929 is mixed with 0.4% of the piperidine-triazine stabilisers listed in Table 3 and 1.6% of dicumyl peroxide, and the mixture is compressed at 125° as described in Example A to give sheets, which are heated at 180° for 15 minutes to bring about crosslinking.

As described in Example A, the "hot set" of the sheets is determined as a measure of crosslinking, and the elongation at tear after oven-ageing is also determined. The results are listed in Table 3.

TABLE 3

| Crosslinking polyethylene into which various stabilisers have been incorporated | | | |
|---|---|---|---|
| | Hot-set elongation, (%) | | Oven-ageing at 150°, time |
| Stabiliser | under load | after removal of the load | required for 50% elongation at tear (days) |
| No. 1 | 110 | 0 | 28 |
| No. 6 | 116 | 0 | >28 |
| No. 7 | 103 | 0 | >28 |
| No. 8 | 108 | 1 | 28 |
| No. 9 | 158 | 5 | 14 |
| No. 11 | 95 | 0 | 21 |
| No. 12 | 60 | 0 | 7 |
| No. 14 | 83 | 0 | 21 |
| No. 15 | 100 | 0 | 28 |
| No. 16 | 85 | 0 | 28 |
| No. 22 | 80 | 0 | 7 |
| No. 27 | 130 | 0 | >28 |
| No. 33 | 149 | 8 | 28 |

Example F

Combination with antioxidants

Low-density polyethylene is mixed as described in Example A with 1.7% of dicumyl peroxide and 0.6% of stabiliser, and the mixture is compressed at 125° to give sheets, which are crosslinked at 240° for 10 minutes. The stabiliser used is, in the first case, a commercially available antioxidant and, in the second case, a stabiliser according to the invention and a mixture of the two stabilisers.

The degree of crosslinking of the samples is tested by determining the hot set, and their resistance to ageing is tested by measuring the tearing force after oven-ageing at 150°. The results are listed in Table 4.

TABLE 4

| | Crosslinking low-density polyethylene | | | | |
|---|---|---|---|---|---|
| | Hot-set elongation (%) | | Tearing force in kg after oven-ageing (days) | | |
| Stabiliser | under load | after removal of the load | 0 | 7 days | 22 days |
| 0.6% stabiliser No. 1 | 65 | 0 | 10.2 | 6.9 | 5.2 |
| 0.6% Irganox(R) 1076* | 178 | 3 | 9.2 | 0 | 0 |
| 0.3% stabiliser No. 1 + 0.3% Irganox(R) 1076 | 71 | 0 | 9.7 | 7.4 | 6.6 |

*Octadecyl β-(4-hydroxy-3,5-di-tert.-butylphenyl)-propionate.

It can be seen that the mixture of stabiliser No. 1 and Irganox® 1076 has approximately the same action as stabiliser No. 1 on its own, while Irganox® 1076 on its own is completely unsuitable.

What is claimed is:

1. A process for chemically bonding polyalkylpiperidine stabilizers to polyolefins or olefin copolymers by grafting ethylenically unsaturated polyalkylpiperidine derivatives, by the action of free radicals produced by chemical or physical means, onto the polyolefin or copolymer, said derivative being a compound of the formula I

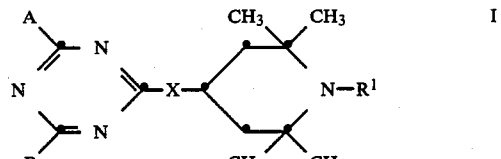

in which $R^1$ is hydrogen, oxyl oxygen, $C_1$–$C_{12}$-alkyl, $C_3$–$C_7$-alkenyl, $C_7$–$C_{11}$-phenylalkyl, cyanomethyl, $C_2$–$C_{18}$-alkanoyl or $C_3$–$C_{18}$-alkenoyl or a group —CON($R^2$)($R^3$) or —CH$_2$—CH($R^4$)—OH in which $R^2$ is $C_1$–$C_{12}$-alkyl, allyl, cyclohexyl, benzyl, phenyl or $C_7$–$C_{12}$-alkylphenyl and $R^3$ is hydrogen, $C_1$–$C_{12}$-alkyl, allyl or benzyl or $R^2$ and $R^3$, together with the N atom to which they are attached, form a 5-membered or 6-membered heterocyclic ring and $R^4$ is hydrogen, $C_1$-$C_{12}$-alkyl, phenyl, $C_2$-$C_{13}$-alkoxymethyl or phenoxymethyl, X is a divalent group of the formula —O—, —N($R^5$)—, —NH—$CH_2$—$CH_2$—, —NH—($CH_2$)$_2$—O—, —NH($CH_2$)$_3$—O— or —N($R^5$)—$R^7$—N($R^6$)— in which $R^5$ is hydrogen, $C_1$-$C_{12}$-alkyl, $C_3$-$C_7$-alkenyl, cyclohexyl, $C_3$-$C_{12}$-alkoxyalkyl, $C_5$-$C_{12}$-alkenoxyalkyl, $C_4$-$C_{12}$-dialkylaminoalkyl, a group —$CH_2$—CH($R^4$)—OH, benzyl or a group of the formula

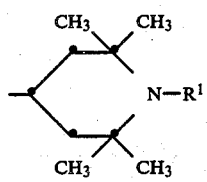

or of the formula

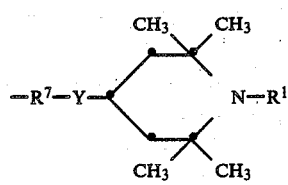

$R^6$ is hydrogen, $C_1$-$C_{12}$-alkyl, $C_3$-$C_7$-alkenyl, cyclohexyl, a group —$CH_2$—CH($R^4$)—OH are group of the formula

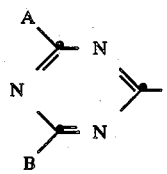

$R^7$ is $C_2$-$C_{12}$-alkylene which can be interrupted by 1, 2 or 3 of the groups —O— or —N($R^6$)—, $C_6$-$C_{14}$-cycloalkylene or cycloalkylenedialkylene, Y is a divalent group of the formula —O— or —N($R^6$)— and A and B, independently of one another, (a) are a group of the formula $R^8$O— or ($R^9$)($R^{10}$)N— in which $R^8$ is $C_1$-$C_{12}$-alkyl, $C_3$-$C_7$-alkenyl, $C_3$-$C_{12}$-alkoxyalkyl, $C_4$-$C_{12}$-dialkylaminoalkyl, cyclohexyl, benzyl, phenyl or $C_7$-$C_{12}$-alkylphenyl, $R^9$ is $C_1$-$C_{12}$-alkyl, $C_3$-$C_7$-alkenyl, $C_5$-$C_8$-cycloalkyl, $C_3$-$C_{12}$-alkoxyalkyl, $C_5$-$C_{12}$-alkenoxyalkyl, $C_4$-$C_{12}$-dialkylaminoalkyl, a group —$CH_2$—CH($R^4$)—OH, phenyl, $C_7$-$C_{12}$-alkylphenyl or $C_7$-$C_{11}$-phenylalkyl and $R^{10}$ is hydrogen, $C_1$-$C_{12}$-alkyl, $C_3$-$C_7$-alkenyl, $C_5$-$C_8$-cycloalkyl, $C_3$-$C_{12}$-alkoxyalkyl, $C_5$-$C_{12}$-alkenoxyalkyl, $C_4$-$C_{12}$-dialkylaminoalkyl, $C_2$-$C_{12}$-alkanoyl, $C_3$-$C_{12}$-alkenoyl, a group —$CH_2$—CH($R^4$)—OH or $C_7$-$C_{11}$-phenylalkyl, or $R^9$ and $R^{10}$, together with the N atom to which they are attached, form a 5-membered or 6-membered heterocyclic ring, or (b) are a group of the formula

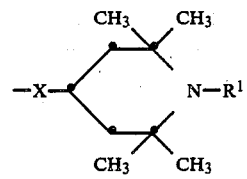

in which at least three of the groups $R^1$, $R^2$, $R^3$, $R^5$, $R^6$, $R^8$, $R^9$ or $R^{10}$ is an alkenyl or alkenoyl radical.

2. A process according to claim 1, wherein the polymer is polypropylene.

3. A process according to claim 1, wherein the polymer is polyethylene or chlorinated polyethylene.

4. A process according to claim 1, wherein the free radicals are produced by adding a free-radical former to the polymer and by heating the polymer above the decomposition temperature of the free-radical former.

5. A process according to claim 4, wherein the free-radical former used is an organic peroxy compound.

6. A process according to claim 4, wherein the free-radical former used is an aliphatic azo compound.

7. A process according to claim 1, wherein the free radicals are produced by irradiating the polymer with high-energy radiation, in particular electron radiation or γ-rays.

8. The process according to claim 1, wherein a phenolic antioxidant is added to the polymer in addition to the derivative stabiliser.

9. A process according to claim 8, wherein the antioxidant added is a derivative of δ-(3,5-di-t.-butyl-4-hydroxyphenyl)-propionic acid, in particular the octadecyl ester thereof.

10. A process according to claim 1, wherein the substituent A or the substituents A and B in formula I are a group of the formula $R^8$O— or ($R^9$)($R^{10}$)N— in which $R^8$ and $R^9$ are $C_3$-$C_7$-alkenyl.

11. A process according to claim 10, wherein A and B are a group of the formula $R^8$O— or ($R^9$)($R^{10}$)N— in which $R^8$ and $R^9$ are allyl.

12. A process according to claim 1, wherein the substituent A in formula I is a group ($R^{9'}$) ($R^{10'}$)N— in which $R^{9'}$ is $C_3$-$C_7$-alkenyl and $R^{10'}$ is $C_1$-$C_{12}$-alkyl, cyclohexyl, hydroxyethyl, benzyl, $C_2$-$C_{12}$-alkanoyl or $C_3$-$C_5$-alkenoxyl.

13. A process according to claim 11, wherein the substituents A and B in formula I are a group $R^8$O— or ($R^9$)($R^{10}$)N— in which $R^8$ and $R^9$ are allyl and X is a group —N($R^5$)— in which $R^5$ is a group of the formula

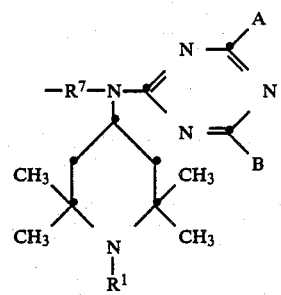

and $R^1$, $R^7$ and $R^{10}$ are as defined in claim 1.

14. A process according to claim 1, wherein $R^1$ in formula I is $C_3$-$C_7$-alkenyl, $C_7$-$C_{11}$-phenylalkyl, cyanomethyl, C$_2$–C$_{18}$-alkanoyl, C$_3$–C$_{18}$-alkenoyl or —CON(R$^2$)(R$^3$).
15. The process of claim 1, wherein said derivative is
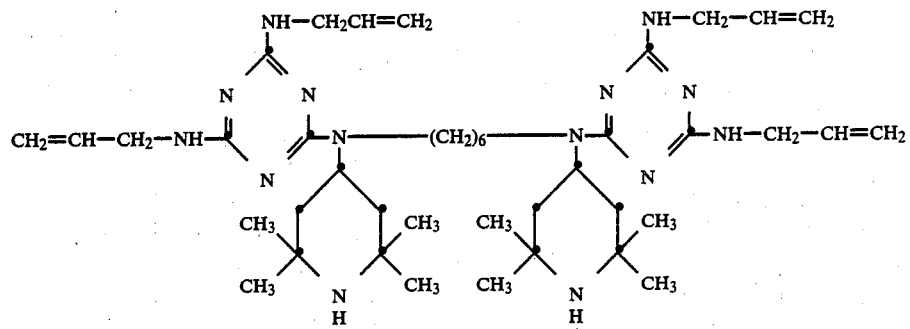
16. The process of claim 1, wherein said derivative is
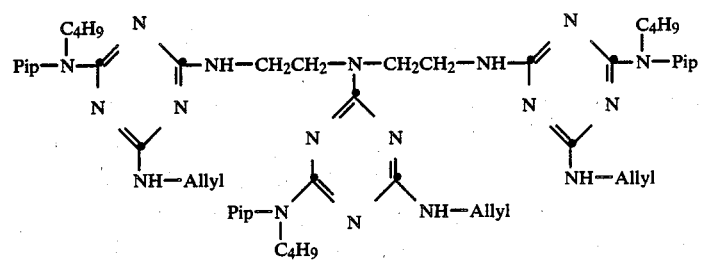
* * * * *